G. B. CALDWELL.
GAS-CARBURETER.
No. 176,425.                    Patented April 25, 1876.
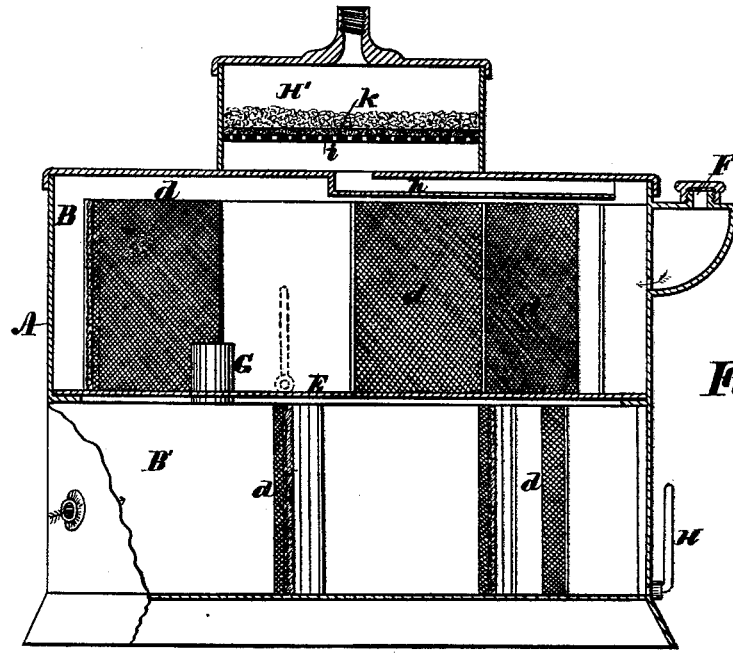
Fig. 1.
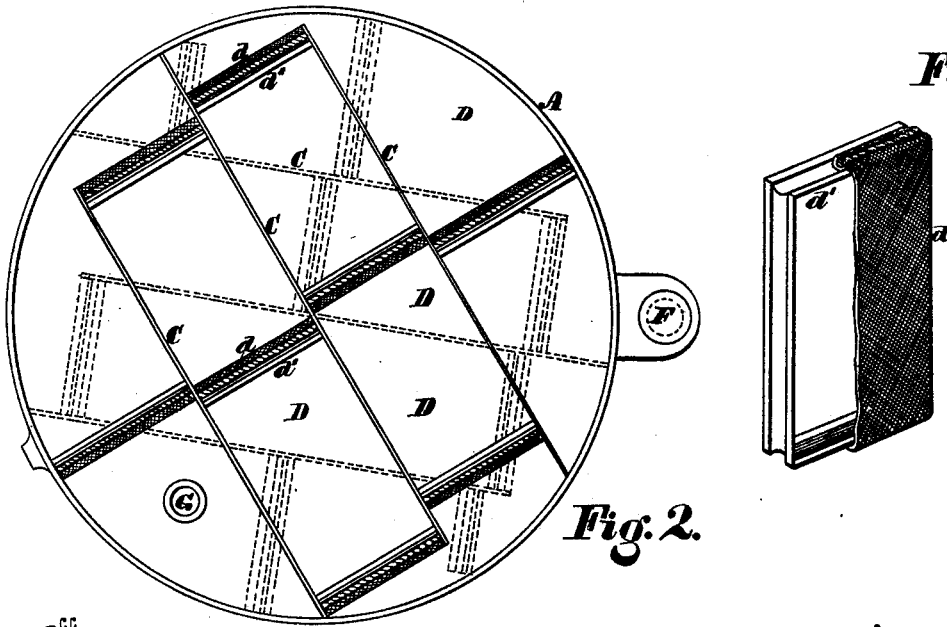
Fig. 3.
Fig. 2.
Witnesses                                     Inventor
                                              George B. Caldwell
                                              Connolly Bros
                                              Attorneys

UNITED STATES PATENT OFFICE.

GEORGE B. CALDWELL, OF PHILADELPHIA, PENNSYLVANIA.

IMPROVEMENT IN GAS-CARBURETERS.

Specification forming part of Letters Patent No. 176,425, dated April 25, 1876; application filed November 15, 1875.

*To all whom it may concern:*

Be it known that I, GEORGE B. CALDWELL, of Philadelphia, in the county of Philadelphia and State of Pennsylvania, have invented certain new and useful Improvements in Gas-Carbureters; and I do hereby declare the following to be a full, clear, and exact description of the invention, such as will enable others skilled in the art to which it pertains to make and use it, reference being had to the accompanying drawings, which form part of this specification, in which—

Figure 1 is a vertical section. Fig. 2 is a plan view of the tank, with the cover removed; Fig. 3, a perspective of one of the screens, partly in section.

This invention has relation to the means for carbureting air for illuminating purposes; and consists in the improved construction, combination, and arrangement of the internal parts of a carbureting-tank, the same being divided into upper and lower compartments communicating with each other, and each divided by vertical parallel partitions into corresponding channels for the circulation of the air and fluid, intersected at intervals by fibrous screens of peculiar form, which absorb the fluid and interpose the same to the currents of air, so as to thoroughly carburet them.

This invention consists furthermore in the provision of novel means for drying the air after the same has been carbureted, said means comprising a suitable receptacle having communication through a screened opening with the carbureting-tank, and containing, as a drying medium, a quantity of sawdust, saturated with a weak solution of sulphuric acid and water.

Referring to the accompanying drawings, A designates a carbureting-tank, preferably of upright cylindrical form. B B' are upper and lower compartments, respectively, of said tank, divided each by means of vertical parallel partitions C C, &c., into a series of corresponding channels, D D, &c. These compartments are rendered separate from each other by means of a horizontal partition or plate, E, to which are attached the partitions of the upper compartments, as shown, and which, with said partitions and the other parts connected therewith, is removable, so that access may be had to any portion of the tank. The channels D D, &c., are intersected at intervals, as shown, by vertical partitions or screens $d$ of any suitable fibrous material, which will absorb the hydrocarbon fluid, and allow of the passage of the air. These screens are attached to rectangular frames $d'$ of sheet metal, having longitudinal grooves in their outer surfaces by being bound thereto with cords wound in the grooves, as shown. The frames are soldered to the partitions C. At opposite ends, respectively, the partitions C terminate alternately a short distance from the wall of the tank, so as to leave spaces for the intercommunication of the channels.

The screens intersecting the outermost or segmentally-formed channels of each series may be conveniently arranged on a line with the diameter of the tank.

The gasoline is supplied to the upper compartment through a tube, F, and, after rising to the height of the tube G, passes through the latter to the lower compartment, where its quantity is regulated by the aid of a gage, H, which indicates the contents. The air is admitted first to the lower compartment, wherein it follows the course of the channels, and thence ascends to the upper compartment, whence it passes through the receptacle H' to the burner or gasometer. The receptacle H' is located above and upon the top of the tank A, and communicates through a horizontal or inclined passage or tube, $h$, with the interior of the tank at a point where the air, after passing through the channels, will enter it. This receptacle is provided with a perforated false bottom, $i$, upon which is placed a fibrous diaphragm, $b$. In the space above is placed the drying and purifying materials, consisting, as before stated, of sawdust saturated with a weak solution of sulphuric acid and water.

The proportions of water and sulphuric acid suitable for use in saturating the sawdust may be stated as one part of the acid to ten of water.

In order to render the screens tight around the edges a coat of shellac may be applied to the grooves in the frames after the cords have been tied on.

Having described my invention, I claim—

1. The grooved screen-frames in combination with the fibrous or porous screens $d$, substantially as described.

2. The combination, with the carbureting-tank, of the receptacle $H'$, containing sawdust saturated with a weak solution of sulphuric acid and water, substantially as and for the purpose specified.

In testimony that I claim the foregoing I have hereunto set my hand this 11th day of November, 1875.

GEORGE B. CALDWELL.

Witnesses:
 G. C. SHELMERDINE,
 M. DANL. CONNOLLY.